(12) United States Patent
Roberts

(10) Patent No.: US 6,445,289 B1
(45) Date of Patent: Sep. 3, 2002

(54) EMERGENCY BRAKING ALERT SYSTEM

(76) Inventor: Shane A. Roberts, 2250 Newport Way NW., Issaquah, WA (US) 98027

( * ) Notice: Subject to any disclaimer, the term of this patent is extended or adjusted under 35 U.S.C. 154(b) by 0 days.

(21) Appl. No.: 09/991,169

(22) Filed: Nov. 16, 2001

(51) Int. Cl.$^7$ ................................................. B60Q 1/50
(52) U.S. Cl. ....................................... 340/467; 340/479
(58) Field of Search ................................. 340/467, 468, 340/463, 464, 466, 441, 471, 479

(56) References Cited

U.S. PATENT DOCUMENTS

| | | | |
|---|---|---|---|
| 3,731,082 A | * | 5/1973 | Blaylock .................... 240/10.5 |
| 3,774,152 A | * | 11/1973 | Tandy .......................... 340/62 |
| 3,939,316 A | | 2/1976 | Stropkay |
| 5,148,147 A | * | 9/1992 | Kobres ....................... 340/464 |
| 5,642,094 A | | 6/1997 | Marcella |
| 5,847,646 A | * | 12/1998 | Mucciacciaro .............. 340/479 |
| 5,909,174 A | | 6/1999 | Dietz et al. |
| 6,020,814 A | | 2/2000 | Robert |
| 6,025,775 A | * | 2/2000 | Erlandson .................... 340/436 |
| 6,067,497 A | * | 5/2000 | Sekine et al. ................. 701/93 |
| 6,150,933 A | | 12/2000 | Matsumoto |
| 6,175,305 B1 | * | 1/2001 | Johnson et al. ............. 340/479 |
| 6,181,243 B1 | * | 1/2002 | Yang .......................... 340/468 |
| 6,351,211 B1 | * | 2/2002 | Bussard ...................... 340/468 |

* cited by examiner

Primary Examiner—Jeffery Hofsass
Assistant Examiner—Son Tang

(57) ABSTRACT

An emergency braking alert system for providing a strobing visual indication of rapid deceleration of a vehicle traveling above a pre-determined minimum speed includes a microcontroller operationally coupled to the braking system and the speedometer of a vehicle. The microcontroller is further operationally coupled to a strobing light for activating the strobing light when rapid deceleration from a high speed is detected. In an embodiment, a deflection member is coupled to the vehicle adjacent the strobing light to prevent temporary blinding of nearby persons.

5 Claims, 4 Drawing Sheets

EMERGENCY BRAKING ALERT SYSTEM

BACKGROUND OF THE INVENTION

1. Field of the Invention

The present invention relates to braking systems and more particularly pertains to a new emergency braking alert system for providing a strobing visual indication of rapid deceleration of a vehicle traveling above a pre-determined minimum speed.

2. Description of the Prior Art

The use of braking systems is known in the prior art. U.S. Pat. No. 6,025,775 describes a system for providing a single nearly subliminal white flash upon rapid braking. This single white flash lasts only milliseconds. Another type of braking systems is U.S. Pat. No. 6,020,814 having a flashing light that is speed related to determine length of display and disproportionate wheel spin for vehicle speed as opposed to pressure on a brake pedal. U.S. Pat. No. 3,939,316 also discloses a panic braking alert system utilizing only a fluid pressure switching device to facilitate showing a level or rate of braking. U.S. Pat. No. 5,642,094 provides various combinations of illumination of existing tail lights to distinguish between types of stopping. U.S. Pat. No. 5,909,174 provides a control device for an existing brake light system. U.S. Pat. No. 5,847,646 provides a time delayed flashing warning light responsive to length of braking time as opposed to immediate panic braking. U.S. Pat. No. 6,150,933 provides a plurality of brake lights that illuminate in sequence with the speed of sequential illumination being dependent on degree of braking.

While these devices fulfill their respective, particular objectives and requirements, the need remains for a system that includes certain improved features such as the deflection shield to prevent blinding of other drivers when using a strong strobing light and activation of the system only when the vehicle begins rapid deceleration from a speed over a pre-determined minimum speed.

SUMMARY OF THE INVENTION

The present invention meets the needs presented above by providing a speed dependent system for activating a strobe light separate from the traditional brake light of a vehicle.

Still yet another object of the present invention is to provide a new emergency braking alert system that directs the strobing light downwardly to prevent temporary blinding of drivers nearby while still attracting attention to the rapid deceleration of the vehicle.

Even still another object of the present invention is to provide a new emergency braking alert system that monitors pressure on the brake pedal to determine when rapid deceleration is occurring.

To this end, the present invention generally comprises a microcontroller operationally coupled to the braking system and the speedometer of a vehicle. The microcontroller is further operationally coupled to a strobing light for activating the strobing light when rapid deceleration from a high speed is detected.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended-hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
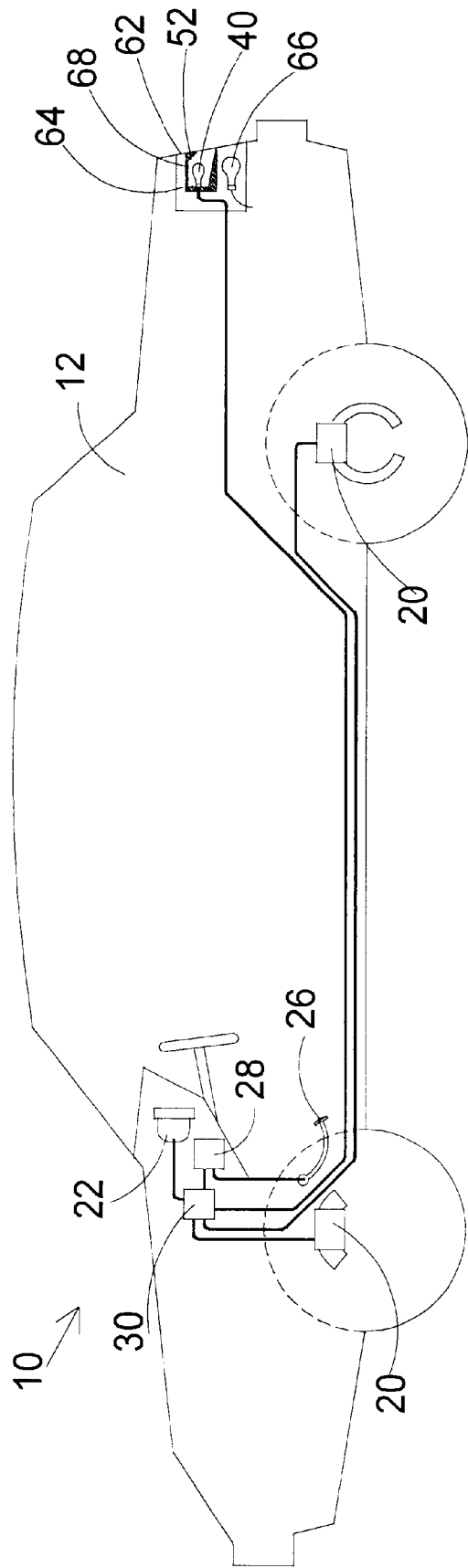
FIG. 1 is a schematic view of a new emergency braking alert system according to the present invention.
Figure 2:
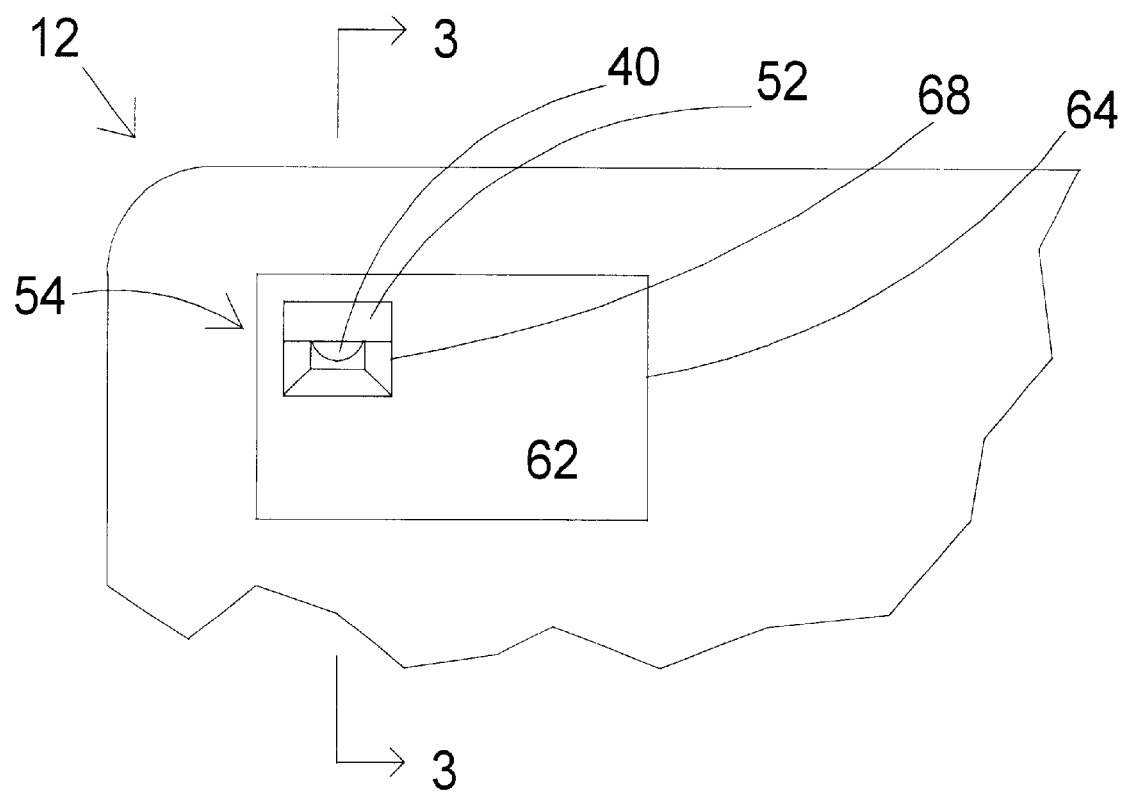
FIG. 2 is an end view of the rear of a vehicle of the present invention.
Figure 3:
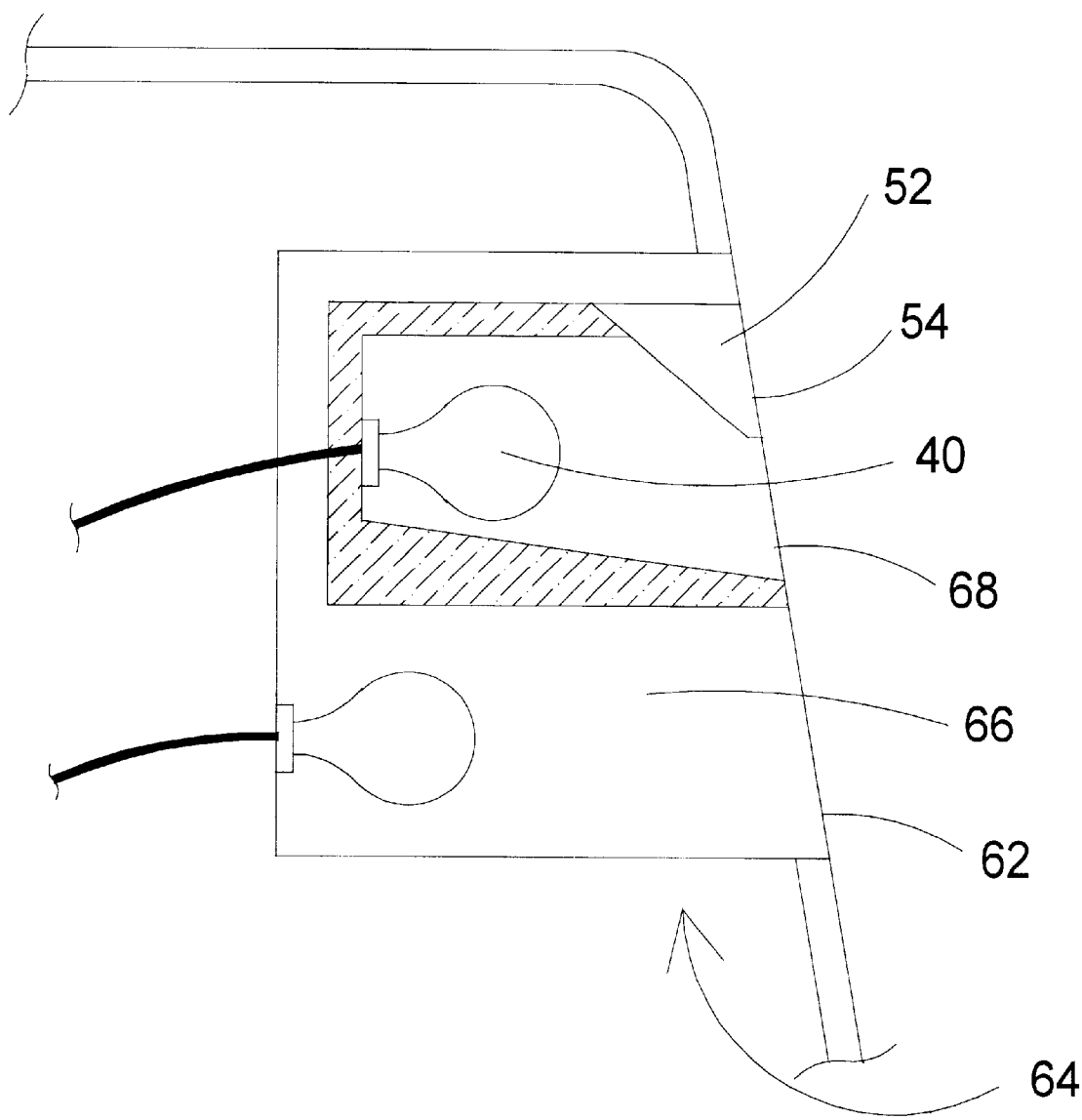
FIG. 3 is a cross sectional view taken along line 3—3 of FIG. 2.
Figure 4:
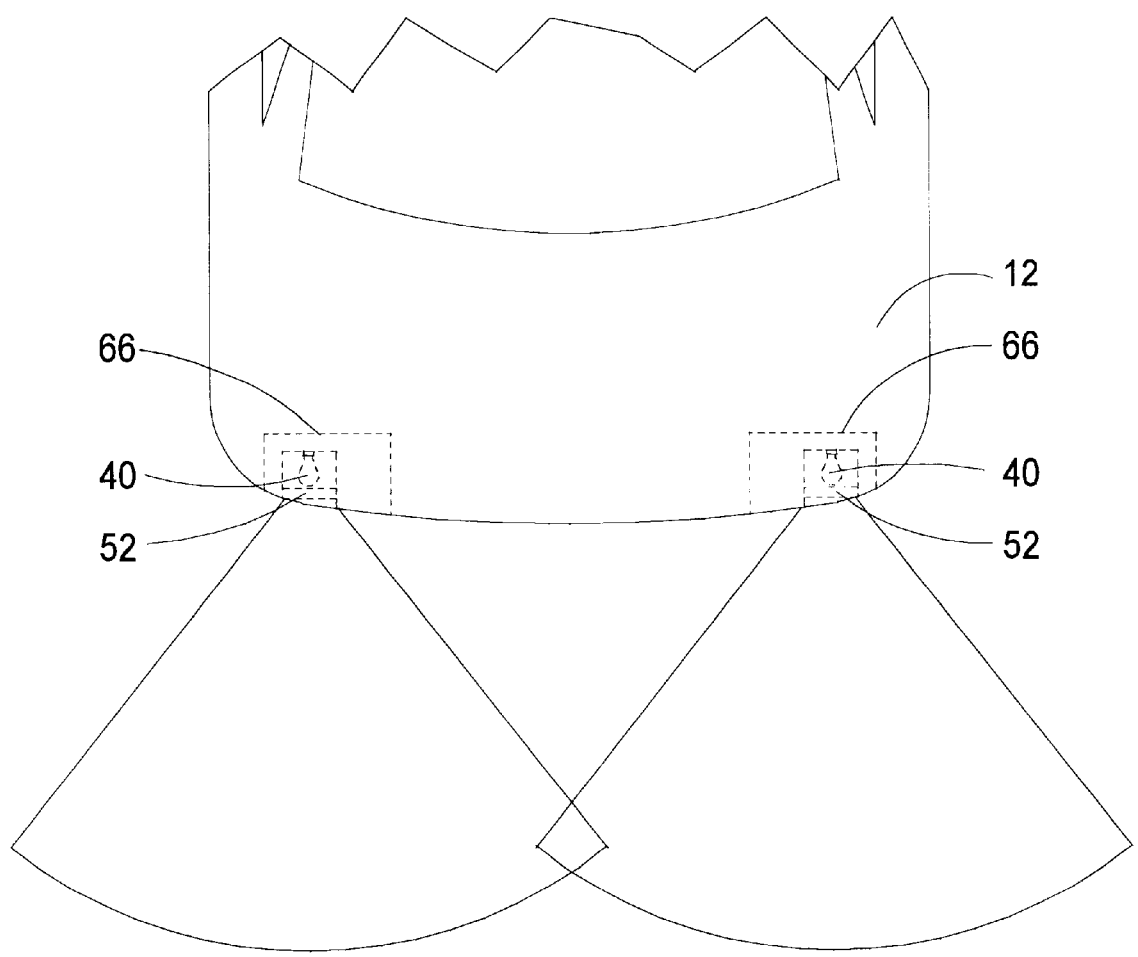
FIG. 4 is a top view of the system of the present invention.

With reference now to the drawings, and in particular to FIGS. 1 through 4 thereof, a new emergency braking alert system embodying the principles and concepts of the present invention and generally designated by the reference numeral 10 will be described.

As best illustrated in FIGS. 1 through 4, the emergency braking alert system 10 generally comprises a vehicle 12 that has a braking system 20 and a speedometer 22. A microcontroller 30 is coupled to the vehicle 12 and is operationally coupled to the braking system 20 for monitoring use of the braking system 20 for rapidly decelerating the vehicle 12. The microcontroller 30 is further operationally coupled to the speedometer 22 of the vehicle 12 for monitoring a speed of the vehicle 12.

A strobing light 40 is operationally coupled to the microcontroller 30. The microcontroller 30 activates the strobing light 40 when the braking system 20 rapidly decelerates the vehicle 12 and the vehicle speed is above a pre-determined minimum speed when the braking system 20 is initially employed. For example, the predetermined minimum speed may preferably be 20 mph in which case the microcontroller of a vehicle traveling 15 miles per hour and undergoing rapid deceleration would not activate the strobing light 40 but the microcontroller of a vehicle traveling 25 miles per hour would activate the strobing light upon detection of rapid deceleration.

The strobing light 40 may be positioned adjacent to a brake light 66 of the vehicle but most preferably is inset into the brake light 66. The brake light 66 is positioned in a brake light opening 64 in the vehicle 12 such that an outer face 62 of the brake light 66 covers the brake light opening 64. The outer face 62 of the brake light 66 has a strobe light opening 68 and the strobing light 40 is positioned in the strobe light opening 68. Thus, the strobing light 40 is inset in the outer face 64 of the brake light 66.

In an embodiment, a deflection member 52 is coupled to the vehicle 12 over an upper portion 54 of the strobe light opening 68. The deflection member 52 is positioned adjacent to the strobing light 40 such that light radiating from the strobing light 40 is directed substantially downwardly. Thus, the deflection member 52 is designed for preventing the strobing light 40 from shining directly into an eye of a person in a vicinity proximate the strobing light 40.

In an embodiment, the braking system 20 of the vehicle includes a pedal member 26. A pressure sensor 28 is coupled to the pedal member 26 for measuring a pressure level urging the pedal member 26 such that the braking system is activated. The microcontroller 30 is coupled to the pressure sensor 26 such that the microcontroller 30 monitors use of the braking system 20.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An emergency braking alert system comprising:
   a vehicle having a braking system and a speedometer;
   a microcontroller coupled to said vehicle, said microcontroller being operationally coupled to said braking system for monitoring use of said braking system for rapidly decelerating said vehicle;
   said microcontroller further being operationally coupled to said speedometer of said vehicle for monitoring a speed of said vehicle;
   a strobing light operationally coupled to said microcontroller, said microcontroller activating said strobing light when said braking system rapidly decelerates said vehicle and said vehicle speed is above a pre-determined minimum speed when said braking system is initially employed;
   said vehicle including a brake light, said strobing light being positioned adjacent said brake light; and
   a deflection member coupled to said vehicle adjacent to said strobing light, said deflection member being positioned above said strobing light such that light radiating from said strobing light is directed substantially downwardly whereby said deflection member is adapted for preventing said strobing light from shining directly in eye of a person in a vicinity proximate said strobing light.

2. The emergency braking alert system of claim 1, further comprising:
   said braking system of said vehicle having a pedal member;
   a pressure sensor coupled to said pedal member for measuring a pressure level urging said pedal member such that said braking system is activated; and
   said microcontroller being coupled to said pressure sensor such that said microcontroller monitors use of said braking system.

3. An emergency braking alert system comprising:
   a vehicle having a braking system and a speedometer;
   a microcontroller coupled to said vehicle, said microcontroller being operationally coupled to said braking system for monitoring use of said braking system for rapidly decelerating said vehicle;
   said microcontroller further being operationally coupled to said speedometer of said vehicle for monitoring a speed of said vehicle;
   a strobing light operationally coupled to said microcontroller, said microcontroller activating said strobing light when said braking system rapidly decelerates said vehicle and said vehicle speed is above a pre-determined minimum speed when said braking system is initially employed;
   said vehicle including a brake light positioned in a brake light opening in said vehicle such that an outer face of said brake light covers said brake light opening, said outer face of said brake light having a strobe light opening, said strobing light being positioned in said strobe light opening whereby said strobing light is inset in said outer face of said brake light; and
   a deflection member coupled to said vehicle over an upper portion of said strobe light opening, said deflection member being positioned adjacent to said strobing light such that light radiating from said strobing light is directed substantially downwardly whereby said deflection member is adapted for preventing said strobing light from shining directly in eye of a person in a vicinity proximate said strobing light.

4. The emergency braking alert system of claim 3, further comprising:
   said braking system of said vehicle having a pedal member;
   a pressure sensor coupled to said pedal member for measuring a pressure level urging said pedal member such that said braking system is activated; and
   said microcontroller being coupled to said pressure sensor such that said microcontroller monitors use of said braking system.

5. An emergency breaking alert system comprising:
   a vehicle having a braking system and a speedometer;
   a microcontroller coupled to said vehicle, said microcontroller being operationally coupled to said braking system for monitoring use of said braking system for rapidly decelerating said vehicle;
   said microcontroller further being operationally coupled to said speedometer of said vehicle for monitoring a speed of said vehicle;
   a strobing light operationally coupled to said microcontroller, said microcontroller activating said strobing light when said braking system rapidly decelerates said vehicle and said vehicle speed is above a pre-determined minimum speed when said braking system is initially employed;
   said vehicle including a brake light positioned in a brake light opening in said vehicle such that an outer face of said brake light covers said brake light opening, said outer face of said brake light having a strobe light opening, said strobing light being positioned in said strobe light opening whereby said strobing light is inset in said outer face of said brake light;
   a deflection member coupled to said vehicle over an upper portion of said strobe light opening, said deflection member being positioned adjacent to said strobing light such that light radiating from said strobing light is directed substantially downwardly whereby said deflection member is adapted for preventing said strobing light from shining directly in eye of a person in a vicinity proximate said strobing light;
   said braking system of said vehicle having a pedal member;
   a pressure sensor coupled to said pedal member for measuring a pressure level urging said pedal member such that said braking system is activated; and
   said microcontroller being coupled to said pressure sensor such that said microcontroller monitors use of said braking system.

\* \* \* \* \*